(12) United States Patent
Vayman

(10) Patent No.: US 7,853,993 B2
(45) Date of Patent: *Dec. 14, 2010

(54) INTEGRATED ACCESS AUTHORIZATION

(75) Inventor: Mark Vayman, Redmond, WA (US)

(73) Assignee: Microsoft Corporation, Redmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,649

(22) Filed: Jan. 5, 2009

(65) Prior Publication Data

US 2009/0150990 A1 Jun. 11, 2009

Related U.S. Application Data

(63) Continuation of application No. 10/957,509, filed on Oct. 1, 2004, now Pat. No. 7,506,364.

(51) Int. Cl.
*G06F 7/04* (2006.01)
*G06F 15/16* (2006.01)
*G06F 17/30* (2006.01)
*G06L 29/06* (2006.01)

(52) U.S. Cl. ............... 726/4; 726/1; 726/2; 726/3; 726/17; 726/23; 726/26; 726/30; 726/15; 714/47; 709/224; 709/225; 709/229; 709/226; 713/168; 713/200; 713/201; 713/167; 707/9; 705/7

(58) Field of Classification Search ............ 726/17
See application file for complete search history.

(56) References Cited

U.S. PATENT DOCUMENTS 5,974,549 A * 10/1999 Golan ............... 726/23
6,647,388 B2 11/2003 Numao et al.

(Continued)

FOREIGN PATENT DOCUMENTS

EP 1 071 017 1/2001

OTHER PUBLICATIONS

"Audit-Failed Logon Attempts by Undefined User Accounts," IBM Technical Disclosure Bulletin, IBM Corporation, vol. 37, No. 6A, Jun. 1, 1994.

(Continued)

*Primary Examiner*—Christopher A Revak
*Assistant Examiner*—Bryan Wright
(74) *Attorney, Agent, or Firm*—Perkins Coie LLP

(57) ABSTRACT

A facility for performing an access control check as an integral component of an operating system and utilizing a centralized policy store is provided. The facility executes as an integral part of an operating system executing on a computer and receives an authorization query to determine whether a principal has authorization to access a resource. The facility applies a policy maintained in a centralized policy store that is applicable to the principal to determine whether authorization exists to access the resource. If authorization does not exist, the facility denies the authorization query and records an indication of the denial of the authorization in an audit log. The facility may trigger events based on the auditing of authorization queries. The facility may also record an indication of authorization to access the resource in the audit log. The facility may additionally determine whether the authorization query is a request for authorization to perform an inherently dangerous operation, and record an indication of an authorization to perform the inherently dangerous operation in the audit log.

16 Claims, 9 Drawing Sheets

U.S. PATENT DOCUMENTS

| | | |
|---|---|---|
| 7,013,332 B2 | 3/2006 | Friedel et al. |
| 7,080,077 B2 | 7/2006 | Ramamurthy et al. |
| 7,231,661 B1 | 6/2007 | Villavicencio et al. |
| 2002/0099952 A1* | 7/2002 | Lambert et al. ............. 713/200 |
| 2003/0023873 A1 | 1/2003 | Ben-Itzhak |
| 2003/0159070 A1* | 8/2003 | Mayer et al. ................ 713/201 |
| 2004/0010519 A1 | 1/2004 | Sinn et al. |
| 2004/0128537 A1 | 7/2004 | Zurko et al. |
| 2005/0177724 A1 | 8/2005 | Ali et al. |
| 2006/0075469 A1 | 4/2006 | Vayman |

OTHER PUBLICATIONS

European Search Report, European Patent Application No. 05 10 8532, Aug. 18, 2006.

* cited by examiner

Computer System 100

- 102 CPU
- 104 Memory
- 106 Persistent Storage
- 108 Computer-Readable Media Drive
- 110 Network Connection

*FIG. 1*

INTEGRATED ACCESS AUTHORIZATION

CROSS REFERENCE TO RELATED APPLICATION

This application is a continuation application of U.S. patent application Ser. No. 10/957,509, filed on Oct. 1, 2004, and entitled "INTEGRATED ACCESS AUTHORIZATION," which is incorporated herein in its entirety by reference.

TECHNICAL FIELD

The described technology is directed to computer security and, more particularly, to controlling access to resources on a computer system.

BACKGROUND

As dependence on computers and computer networks increases along with the sophistication and the frequency of attacks on computers and computer networks, the subject of computer security is becoming ever more prominent in the industry. Current computer security techniques are inadequate in protecting application programs and operating systems from malicious software ("malware")—e.g., viruses, worms, and trojans—designed specifically damage or disrupt a computer system, and other undesirable activity.

Existing access control security models typically rely on a user's credentials to authorize access to resources on a computer. In these models, every process that runs or executes with the same credentials is given the same access rights, whether or not the process needs access to all the resources that is available to the user. Also, a process that needs access to a resource, e.g., to read, write, etc., specifies the required access at the time the resource is accessed.

For example, a user logs on to a personal computer with a user account, and expects to be able to access all word processing documents stored on the personal computer and created using a particular word processing program. In order to satisfy this expectation, a conventional access control security system grants all programs running in the users context permission to access to all of the aforementioned word processing documents. This is a grant of an excess level of permission, however, because few programs running in the user context other than the word processing program actually need to access to any of the word processing documents.

Typically, malware infects processes by exploiting code defects. Once malware runs inside of a compromised process, it inherits the access rights of the user context in which the process is running, and gets access to all resources that are available to the user, which might be far greater than what the original process ever needed.

Accordingly, an integrated approach to access authorization that improves and enhances the security of resources on a computer will have significant utility.

BRIEF DESCRIPTION OF THE DRAWINGS

FIG. 1 is a block diagram illustrating selected components typically incorporated in at least some of the computer systems on which the facility executes.

DETAILED DESCRIPTION

Figure 2:
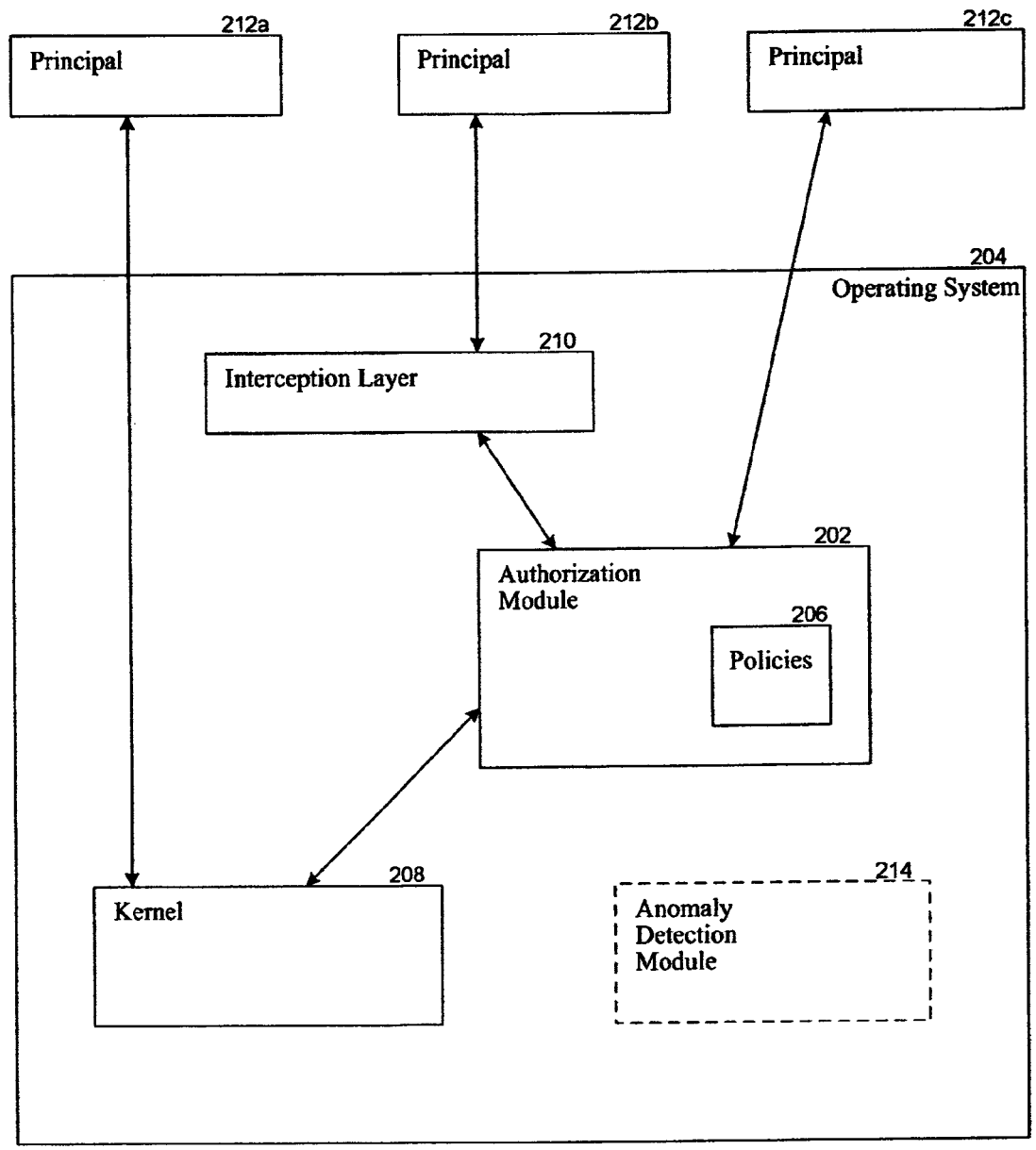
FIG. 2 is a block diagram illustrating selected components of the facility, according to some embodiments.

A software facility ("facility") for protecting a computer system from the adverse effects arising from exploits against application and operating system programs on the computer system is described. In some embodiments, the facility is implemented as an integral part of the operating system and adds a logic-driven access control layer to the operating system. For example, the facility is implemented in a manner that is integral to the operating system access control mechanism.

The facility may provide an authorization module that receives authorization queries for various security-sensitive resource accesses and returns a decision to allow or deny a resource access based on a centralized policy. A policy is a set of rules and practices that determine how a resource—such as, by way of example, a network, a file system, an application program, etc.—is managed and protected. In a centralized policy store, the rules in a policy are centrally located, which allows the rules and/or the policy to be revoked centrally and set centrally. This is in contrast to a distributed or per-object access control model, typically implemented using access control lists that are bound to physical objects.

The authorization module may be queried directly by the various operating system components that service resource access requests issued by user mode programs, e.g., application programs executing in a user context. Alternatively, the authorization module may be queried by an "interception layer" sitting on top of such operating system components. The interception layer is code that intercepts the system call functions used by the user mode programs to access the resources, and applies "wrappers" to the intercepted system call functions. The authorization module makes its access control decisions (i.e., allow or deny) based on an identity of a principal, which is either the identity of the application program—e.g., application process—attempting the resource access, or a combination of the identity of the application program and the identity of the user on whose behalf the application program is executing, and a policy that applies to the principal.

In some embodiments, the facility provides an auditing feature. For example, a policy may indicate that a particular action, whether authorization is either allowed (e.g., granted) or denied (e.g., blocked), to be the subject of an audit so that an entry is added to an audit log. The entry may include an indication of the failed rule, the resource or object, and the principal. For certain operations, such as inherently dangerous operations, the entry may include an indication of the rule, whether the rule was allowed or denied, the resource or object, and the principal. The facility may additionally trigger events based on the audit. For example, the facility may be configured to provide the principal (e.g., the application program and/or the user) or other interested party a notification or indication of the failed rule or the inherently dangerous operation.

In some embodiments, the facility provides a learning mode feature where the facility tests or reports on a rule instead of applying the rule. For example, a rule in a policy may specify that a request for authorization to perform an action be denied. If learning mode is activated for the rule, for example, by an author of the policy, the facility, rather than denying the requested authorization to perform the action, allows or grants the authorization to perform the action, and raises an event indicating that the request for authorization to perform the action would have been denied. The facility may generate a report, which indicates, for example, the rule that would have been blocked, state of the application program prior to requesting the action, and the like. The learning mode feature facilitates fine-tuning of the policy. For example, an author of a policy can analyze the report and make a determination of whether a policy or a rule in the policy needs to be more or less restrictive.

In some embodiments, the facility is executed as part of a tiered access control check. Here, the facility performs it policy check as part of a series of access control checks. For example, when a resource request is made, the conventional access control mechanism may initially be invoked to determine whether there is authorization for the requested resource. Subsequent to the conventional access control mechanism initially determining that there is authorization for the requested resource, the facility may be invoked to check its policies to determine whether there is authorization for the requested resource. Subsequently, one or more further access control checks may additionally be invoked to ultimately determine whether there is authorization for the requested resource.

The various embodiments of the facility and its advantages are best understood by referring to FIGS. 1-10 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

FIG. 2 is a block diagram illustrating selected components of the facility, according to some embodiments. As illustrated in FIG. 2, the facility includes an authorization module 202 which is implemented as an integral component of an operating system 204 suitable for executing on computer system 100. Authorization module 202 generally functions as an added protection layer to high risk processes such as network facing applications, network facing services and operating system components, applications dealing with untrusted content, and untrusted code, e.g., typically, code delivered via the Internet. Authorization module 202 provides the logic for performing the policy driven access control of the resources available on computer system 100.

The facility also includes policies 206 from which authorization module 202 makes its access control decisions. Policies 206 are the rules that determine whether to allow or deny a request for authorization to access a resource. In some embodiments, policies 206 get compiled into runtime—e.g., binary—rules that get enforced by operating system 204 and, in particular, authorization module 202. In some embodiments, policies 206 are implemented as part of a centralized policy store, which allows policies 206, including the rules in the policies 206, to be revoked centrally and set centrally, for example, by users and/or administrators.

Authorization module 202 may be queried by the various operating system kernel components 208 that service resource access requests issued by a principal, e.g., a principal 212a. Authorization module 202 may also be queried by an interception layer 210 that intercepts the system call functions issued by a principal, e.g., a principal 212b, to access the resources. Interception layer 210 applies wrappers to the intercepted system call functions to enable authorization module 202 to perform the access control check against the applicable policy 206. For example, applying a wrapper may include determining the identity of the principal and/or various environmental factors associated with computing system 100 and providing this information as part of a request for authorization to perform a system call to authorization module 202 to enable it to perform the access control check. Moreover, authorization module 202 may directly be queried by a principal, e.g., a principal 212c.

In some embodiments, the access control check performed by authorization module 202 is a function of a principal making the resource access request and a policy that applies to the principal. As such, authorization module 202 makes its access control decisions (i.e., allow or deny) based on an identity of a principal—either the identity of a calling application program, or the combination of the identity of the calling application program and the identity of a user on whose behalf the application program is executing—and the rules in the policy that are applicable to the principal. In some embodiments, authorization module 202 may additionally consider parameters, such as, by way of example, type of access requested, environmental factors—e.g., is the computer on which the application program is executing inside a corporate network or connected to a public network, patch level of the computer, etc.—in addition to the identity of the principal and the rules in the policy that are applicable to the principal in making its access control decision.

In some embodiments, the facility may include an optional anomaly detection module 214 as depicted by the broken or "dashed" lines in FIG. 2. Anomaly detection module 214 generally functions to monitor the behavior of computer system 100 and the programs executing on computer system 100 in order to detect an anomalous state. In some embodiments, anomaly detection module 214 provides the facility a first notification upon detecting an anomaly and a subsequent, second notification upon detecting the cessation of the previously detected anomaly. This enables the facility to activate the enforcement of policies 206 upon detection of an anomaly, until the anomaly has ended, after which policies 206 are no longer enforced. Alternatively, the facility may initially impose a less restrictive set of policies until an anomaly is detected, in which case a more restrictive set of policies are enforced, until the anomaly has ended and the less restrictive set of policies are again enforced. Anomaly detection module 214 may detect an anomaly in either a single process executing on computer system 100, a group of processes executing on computer system 100, or the entire computer system 100.

The aforementioned aspects of the facility are only illustrative and are not intended to suggest any limitation as to the implementation of the illustrated components and/or the scope of use or functionality of the facility. For example, in some embodiments, authorization module 202 need not be implemented as part of or integral to operating system 204, but may be implemented separate of or outside operating system 204, for example, as a non-operating system program. Moreover, in some embodiments, policies 206 need not be implemented as or a part of a centralized policy store. Thus, policies 206 need not be in one place, but may be implemented using, for example, a distributed model. Furthermore, even though policies 206 are depicted as part of or contained in authorization module 202, policies 206 need only be accessible by authorization module 202.

In the discussion that follows, embodiments of facility are described in conjunction with a variety of illustrative examples. It will be appreciated that the embodiments of facility may be used in circumstances that diverge significantly from these examples in various respects.

Figure 3:
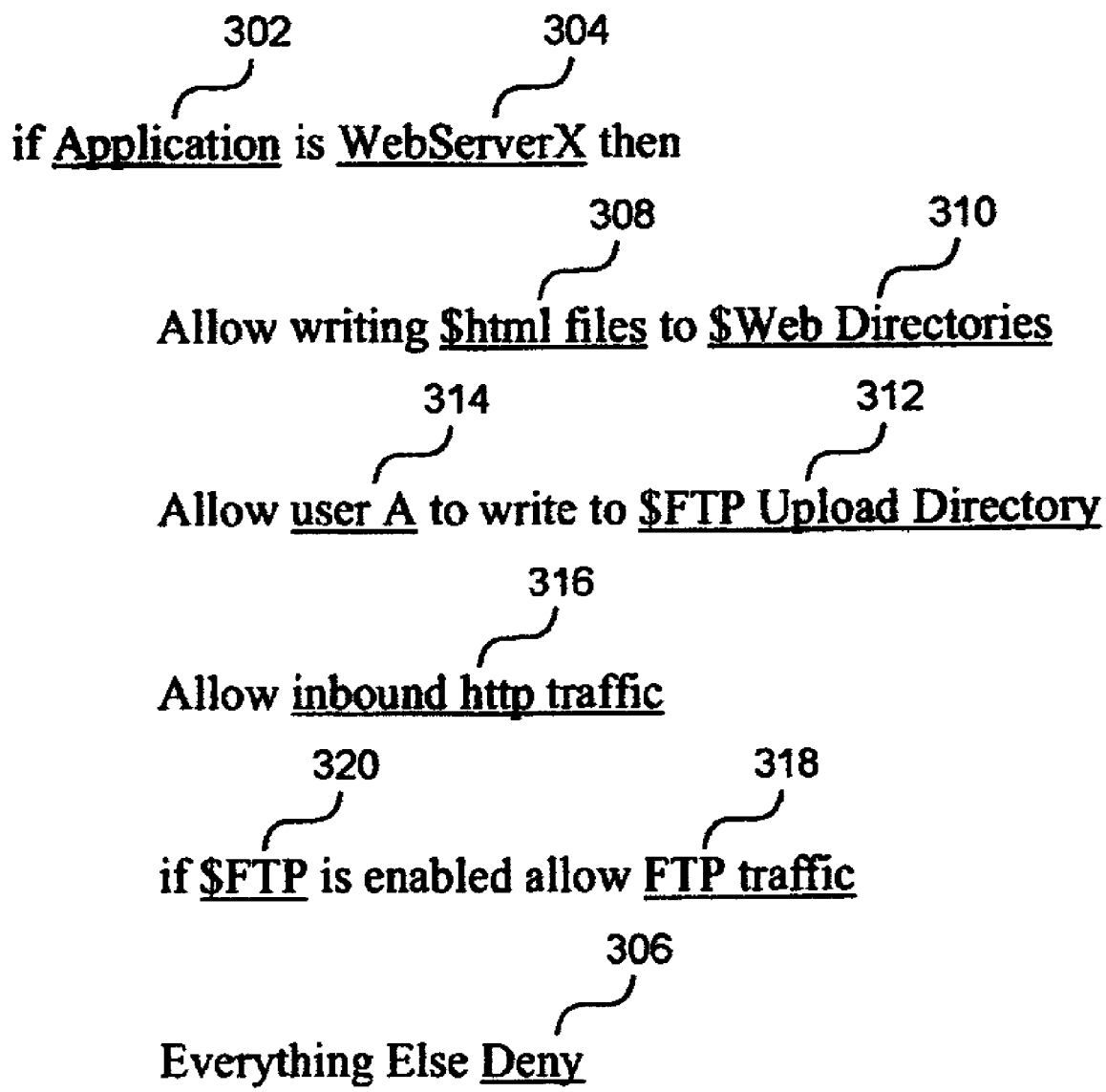
FIG. 3 illustrates an example policy suitable for use by the facility, according to some embodiments.

FIG. 3 illustrates an example policy suitable for use by the facility, according to some embodiments. The example policy includes the rules to protect a web server application. By way of example, an application process, as indicated by item 302, requesting a resource is checked to determine if it is a WebServerX web server process, as indicated by item 304. If authorization module 202 determines that the requesting application process is a WebServerX web server process, authorization module 202 either allows or denies authorization for the requested resource based on the rules included in the policy.

As illustrated, the example policy contains the privileges or access rights granted to a WebServerX process, and the default is to deny authorization for the requested resource, as indicated by rule 306, unless the privilege or access right is specified. Stated another way, unless the requested resource is explicitly granted in the policy, authorization for the requested resource is denied. In some embodiments, the policy may contain rules that specify access restrictions, e.g., rules that specify that authorization to perform particular actions be denied or that deny authorization to access resources, or rules that cause an audit, e.g., log an event.

The first rule in the example policy is a directive to permit the WebServerX process to write "$html" files, as indicated by item 308, to "$WebDirectories," as indicated by item 310. The "$html" is a representation of a collection of file types, for example, *.html, *.gif, etc. The "$WebDirectories" is a representation of a collection of directories configured to be web directories, and may be defined by an administrator, such as a web administrator, who is different than the creator of the policy, such as a security administrator. For example, authorization module 202 returns an allow decision (i.e., grant of authorization) based on this rule in response to a WebServerX process requesting to write a file of a type defined by the parameter "$html" to one of the directories defined by the parameter "$WebDirectories." Thus, a rule in the policy may apply to dynamic, independently defined groups of objects, such as "$WebDirectories," and dynamically configurable environment parameters, such as "$html."

The second rule in the example policy is a directive to permit the WebServerX process to write to the "$FTP Upload Directory," as indicated by item 312, if it is executing on behalf of "user A," as indicated by item 314. For example, authorization module 202 returns an allow decision (i.e., grant of authorization) based on this rule in response to a WebServerX process executing on behalf of user A requesting to write to the "$FTP Upload Directory."

The third rule in the example policy is a directive to permit inbound http traffic, as indicated by item 316. For example, authorization module 202 returns an allow decision (i.e., grant of authorization) based on this rule in response to a WebServerX process requesting to receive inbound http data, e.g., receive http data packets transmitted over a network connection.

The fourth rule in the example policy is a directive to permit "FTP traffic," as indicated by item 318, if the variable "$FTP" is enabled, as indicated by item 320. Here, "$FTP" is a variable, and may be set by an administrator who is different than a security administrator who created the policy. For example, authorization module 202 performs a run-time check to determine if the variable "$FTP" is enabled, and if so, returns an allow decision (i.e., grant of authorization) based on this rule in response to a WebServerX process requesting to send or receive data defined by the parameter "FTP traffic." Alternatively, if the "$FTP" is not enabled, authorization module 202 will return a deny decision (i.e., denial of authorization) in response to the aforementioned access request as indicated by item 306.

It will be appreciated that the policy may include rules that define privileges for objects within and outside the operating system, such as application processes as illustrated by the example privilege above. The rules in a policy may be specified using a rich schema, similar to writing code using compiled or interpreted programming language. For example, the schema may support the inclusion of conditions and temporal conditions, e.g., "allow X only if Y," dependencies on dynamically configurable environment parameters and variables, dependencies on environmental factors, and the like, in the rules. Moreover, the use of parameters facilitates the creation of rules that apply to both present and future objects. For example, documents of a particular type may be represented by a parameter, and using the parameter, a rule can be created that specifies a restriction that applies to all documents of that particular type, whether currently in existence or later created. In some embodiments, the policy may specify that certain decisions are to be relegated to the end user for decision, for example, through a pop-up dialog box.

Figure 4:
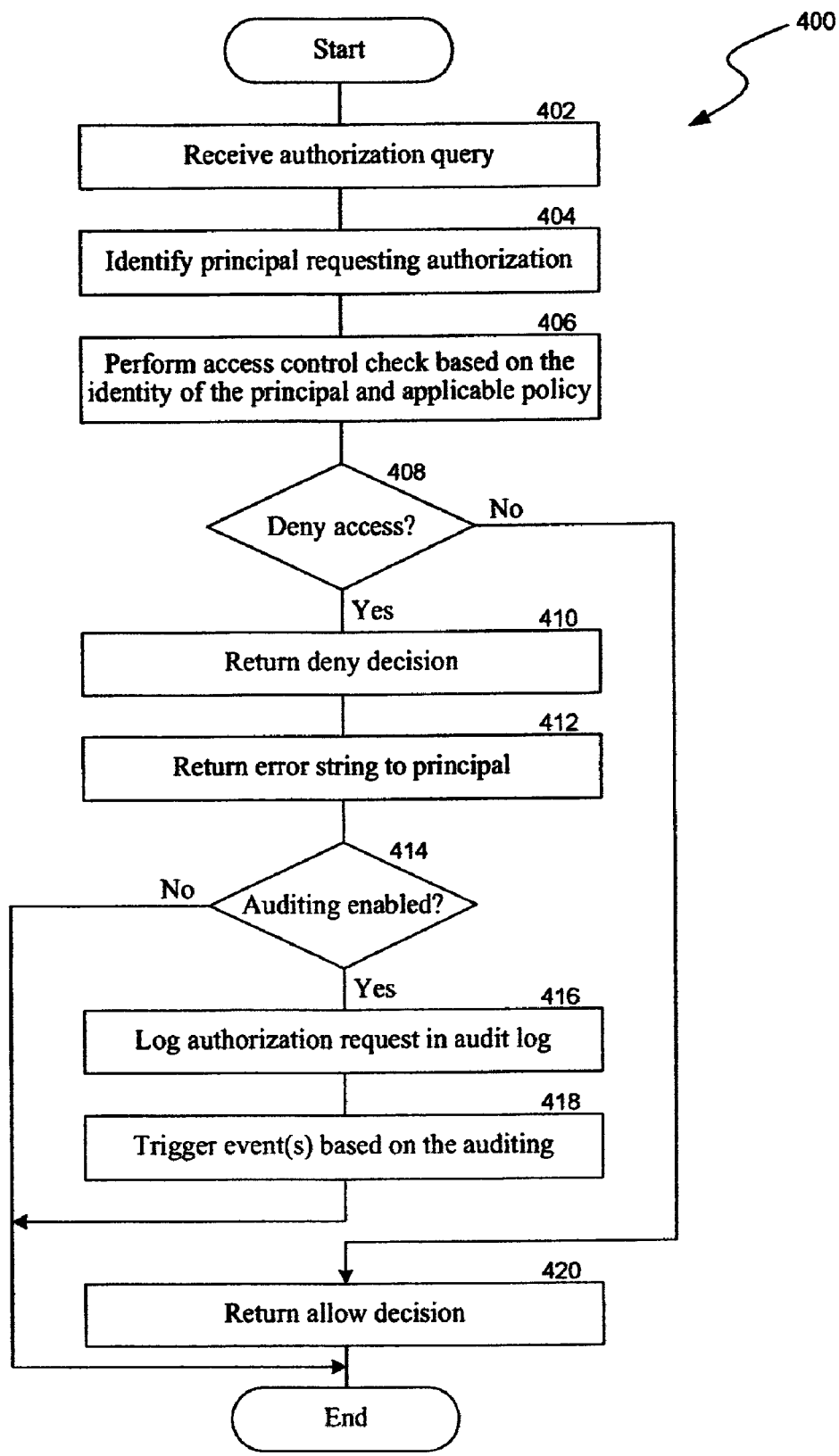
FIG. 4 illustrates a flow chart of a method by which the facility performs auditing of denied access requests, according to some embodiments.

FIG. 4 illustrates a flow chart of a method 400 by which the facility performs auditing of denied access requests, according to some embodiments. By way of example, a user (e.g., UserABC) may have logged on to a computer and started a word processing application (e.g., WPApp) and requested to open a file (e.g., FileX) stored in a directory (e.g., YZDir) on the computer. As a result, WPApp issues a request to access the resource FileX stored in directory YZDir. Beginning at a start step, authorization module 202 receives the authorization query, e.g., a request for authorization to access FileX stored in YZDir, at step 402.

At step 404, authorization module 202 identifies the principal that is requesting the authorization to access FileX stored in YZDir. In the above example, the principal may either be WPApp or the combination of WPApp and UserABC. At step 406, authorization module 202 identifies the policy applicable to the identified principal, for example, from a centralized policy store such as policies 206, and performs an access control check based on the identity of the principal and the applicable policy. At step 408, authorization module 202 determines whether the result of the access control check performed in step 406 is to deny access. Continuing the above example, authorization module 202 analyzes the identified applicable policy to determine whether a rule or privilege in the policy authorizes the principal to access FileX stored in YZDir, at step 408.

If authorization module 202 determines that the applicable policy authorizes the principal to perform the requested action, then at step 420, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 410, authorization module 202 returns a deny decision, which is an indication that the principal is not authorized to perform the requested action. At step 412, authorization module 202 may return an error string to the principal, informing the principal of the lack of authorization to perform the requested action.

At step 414, authorization module 202 checks to determine whether auditing is enabled. A flag or a record associated with the applicable policy or rule may indicate whether to perform auditing. If auditing is not enabled, authorization module 202 proceeds to an end step. Alternatively, if auditing is enabled, authorization module 202 makes an entry in an audit log at step 416. The entry may identify the denied request, the failed rule, the principal, and/or the requested resource.

At step 418, authorization module 202 may trigger one or more events based on the auditing of the denied request. For example, authorization module 202 may provide a security administrator an indication, e.g., via email, voice mail, text messaging, etc., of the attempt by the principal to perform an unauthorized action, terminate the application process subsequent to the attempt by the principal to perform an unauthorized action, impose a stricter set of policies subsequent to the attempt by the principal to perform an unauthorized action, and the like. Subsequent to triggering the events, authorization module 202 proceeds to an end step.

Those of ordinary skill in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 5:
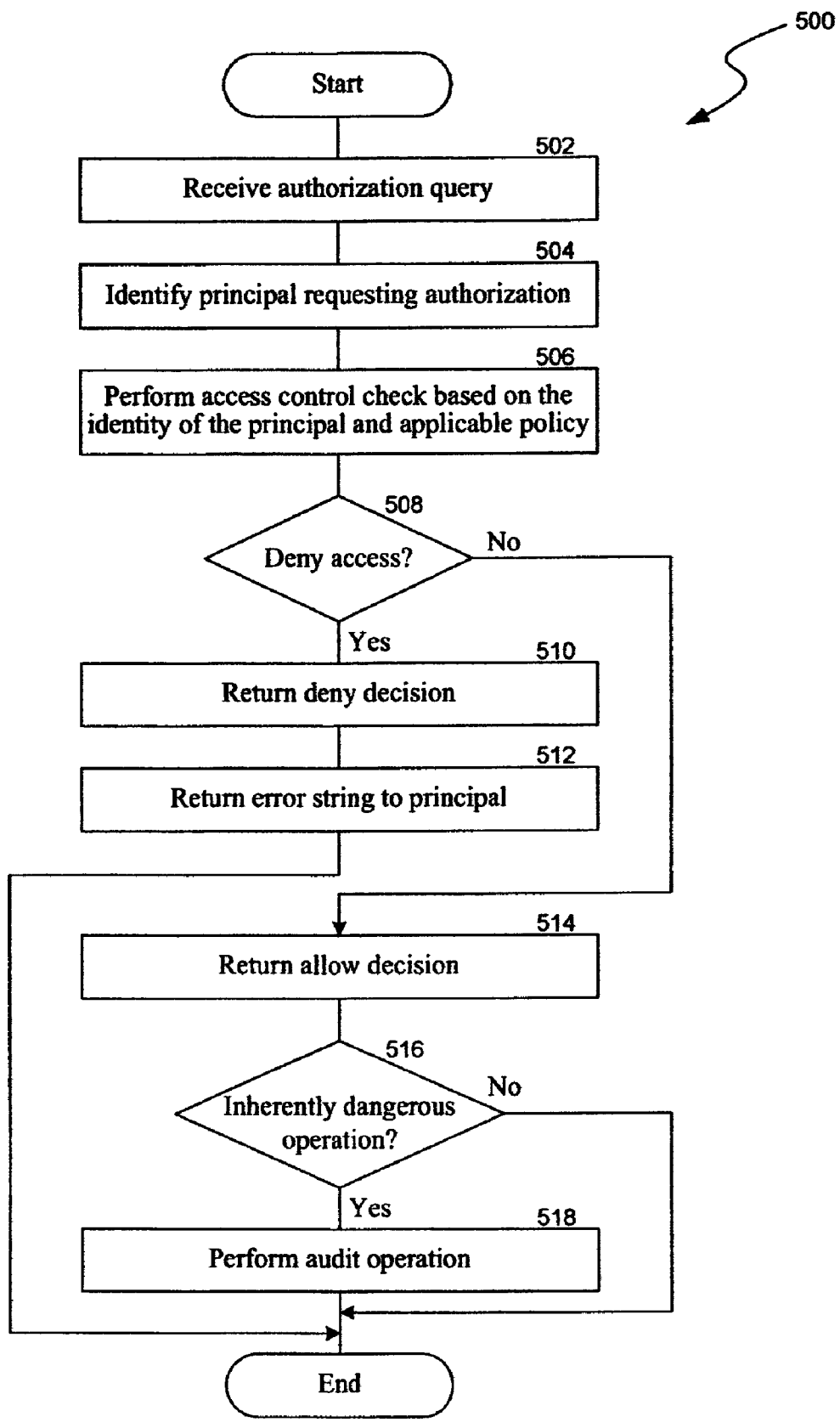
FIG. 5 illustrates a flow chart of a method by which the facility performs auditing of inherently dangerous operations, according to some embodiments.

FIG. 5 illustrates a flow chart of a method 500 by which the facility performs auditing of inherently dangerous operations, according to some embodiments. By way of example, a user (e.g., UserABC) may have logged on to a computer and started a web browser program (e.g., WebBrowser) and requested to access a web page (e.g., PageX) on an untrusted web site (e.g., WebSiteY). As a result, WebBrowser issues a request to retrieve PageX from WebSiteY. Steps 502-508 are substantially similar to steps 402-408 of method 400.

If, at step 508, authorization module 202 determines that the applicable policy does not authorize the principal to perform the requested action, then at step 510, authorization module 202 returns a deny decision, which is an indication that the principal is not authorized to perform the requested action. In the above example, WebBrowser may not have authorization to access untrusted site WebSiteY. At step 512, authorization module 202 may return an error string to the principal, informing the principal of the lack of authorization to perform the requested action. Subsequent to returning an error string, authorization module proceeds to an end step.

Alternatively, if authorization module 202 determines that the applicable policy authorizes the principal to perform the requested action, then at step 514, authorization module 202 returns an allow decision, which is an indication that the principal is authorized to perform the requested action. At step 516, authorization module 202 checks to determine whether the authorized action is an inherently dangerous operation. For example, the facility may maintain a list of inherently dangerous operations, and authorization module 202 may check this list to determine if the authorized action is listed as an inherently dangerous operation.

If the authorized action is found to be an inherently dangerous operation, then at step 518, authorization module 202 performs an audit operation. For example, authorization module 202 may make an entry in an inherently dangerous operation audit log of an indication of the request and authorization to perform the inherently dangerous operation. The entry may also include an indication of the principal that requested the authorization to perform the inherently dangerous operation. Authorization module 202 may additionally perform other actions which may be triggered by the authorization to perform the inherently dangerous operation. Subsequent to performing the audit operation at step 518, or determining that the authorized action is not an inherently dangerous operation at step 516, authorization module 202 proceeds to an end step.

In some embodiments, authorization module 202 may make an entry in the inherently dangerous operation audit log of an indication of a request of authorization to perform an inherently dangerous operation. Continuing the above example, assuming that accessing untrusted site WebSiteY is indicated to be an inherently dangerous operation and, further, the applicable policy does not grant WebBrowser authorization to access WebSiteY, authorization module 202 returns a deny decision (step 510) and records the request for authorization to perform the inherently dangerous operation and the subsequent denial of authorization, for example, in the inherently dangerous operation audit log. Authorization module 202 may also record an indication of the principal that requested authorization to perform the inherently dangerous activity.

Figure 6:
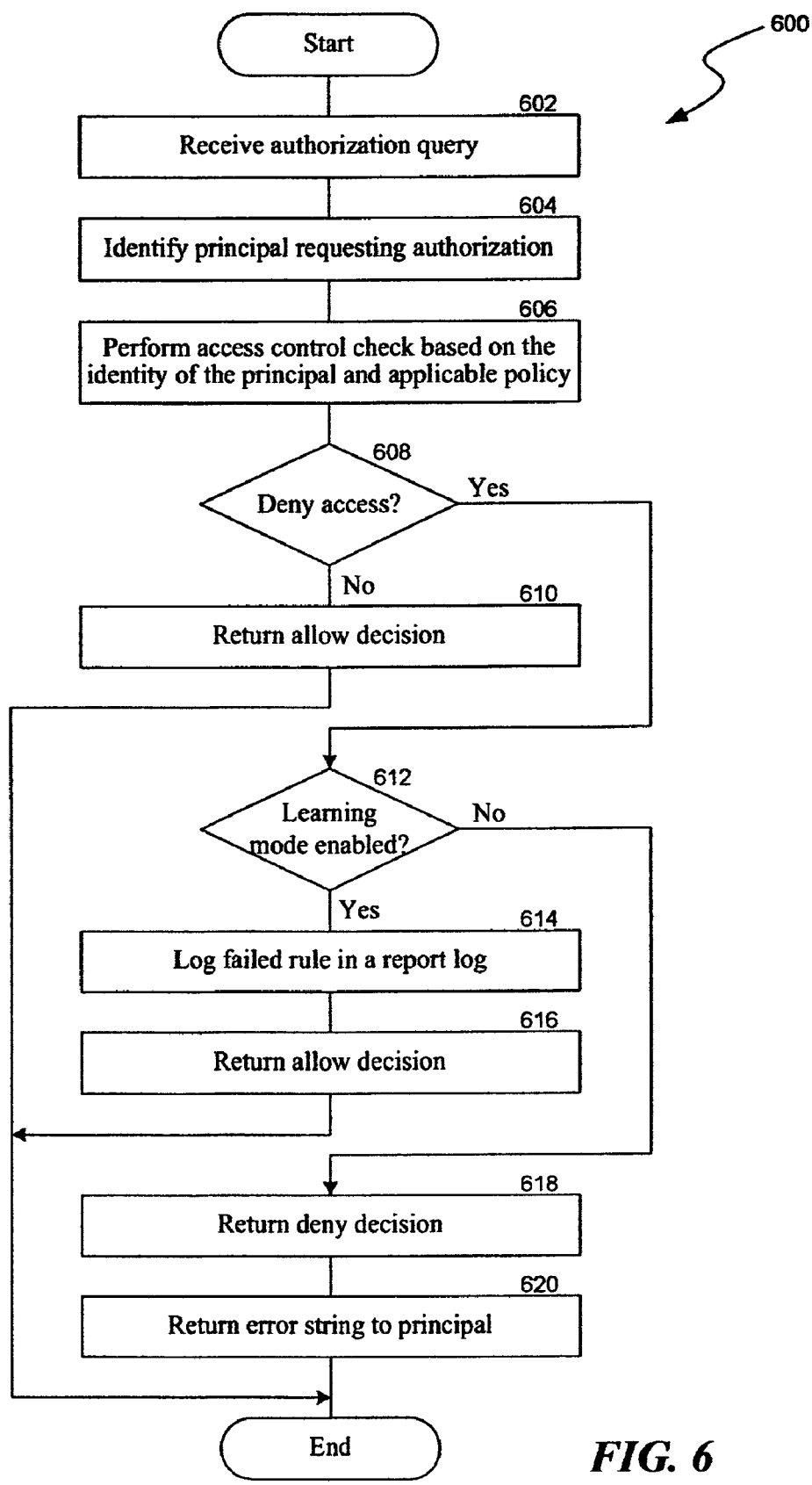
FIG. 6 illustrates a flow chart of a method by which the facility performs learning to facilitate fine-tuning of a policy, according to some embodiments.

FIG. 6 illustrates a flow chart of a method 600 by which the facility performs learning to facilitate fine-tuning of a policy, according to some embodiments. By way of example, a user (e.g., UserABC) may have logged on to a computer and started a web browser program (e.g., WebBrowser) and requested to access a web page (e.g., PageX) on a web site (e.g., WebSiteY). As a result, WebBrowser issues a request to retrieve PageX from WebSiteY. Steps 602-608 are substantially similar to steps 402-408 of method 400.

If, at step 608, authorization module 202 determines that the applicable policy authorizes the principal to perform the requested action, then at step 610, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 612, authorization module 202 checks to determine whether learning is enabled for the rule in the policy that denies authorization to perform the requested action. Continuing the above example, a policy applicable to WebBrowser may contain a rule that expressly denies WebBrowser access to the Internet and, thus, WebSiteY, but, may also provide an indication to apply learning instead of applying the rule.

If authorization module 202 determines that learning is not enabled for the rule that denies authorization to perform the requested action, then at step 618, authorization module 202 returns a deny decision, which is an indication that the principal is not authorized to perform the requested action. In the above example, the rule that expressly denies WebBrowser access to the Internet and, thus, WebSiteY, may not have an indication to apply learning. In this instance, the rule is applied and WebBrowser is denied authorization to access WebSiteY. At step 620, authorization module 202 may return an error string to the principal, informing the principal of the lack of authorization to perform the requested action. Subsequent to returning an error string, authorization module proceeds to an end step.

Alternatively, if, at step 612, authorization module 202 determines that learning is enabled for the rule that denies authorization to perform the requested action, then at step 614, authorization module 202 makes an entry in a learning report log of an indication of the failed rule. The entry may also include an indication of the principal that requested the authorization to perform the action that resulted in the failed rule. At step 616, authorization module 202 returns an allow decision, which is an indication that the principal is authorized to perform the requested action, and proceeds to an end step. Thus, instead of applying the applicable rule, authorization module 202 grants authorization to perform the requested action and records an indication of this event. A security administrator or other interested user can then analyze the contents of the learning report log to determine whether a rule or policy is too restrictive or not restrictive enough, and fine-tune the rule or policy before actually enforcing or implementing the rule or policy.

In some embodiments, authorization module 202 may make an entry in the learning report log of an indication of a rule that provided the authorization to perform a requested action. Continuing the above example, assuming that a rule expressly authorizes WebBrowser access to the Internet and, thus, WebSiteY, and also provides an indication to apply learning, authorization module 202 returns an allow decision (step 610) and records an indication of the rule that provided the authorization to perform the requested action. This information may also be used to fine-tune the rule or policy. For example, if it is determined from the entries in the report log that authorization to access a resource was too readily granted, the rule or policy may be adjusted or altered to reduce the instances where authorization to access to the resource is granted.

Figure 7:
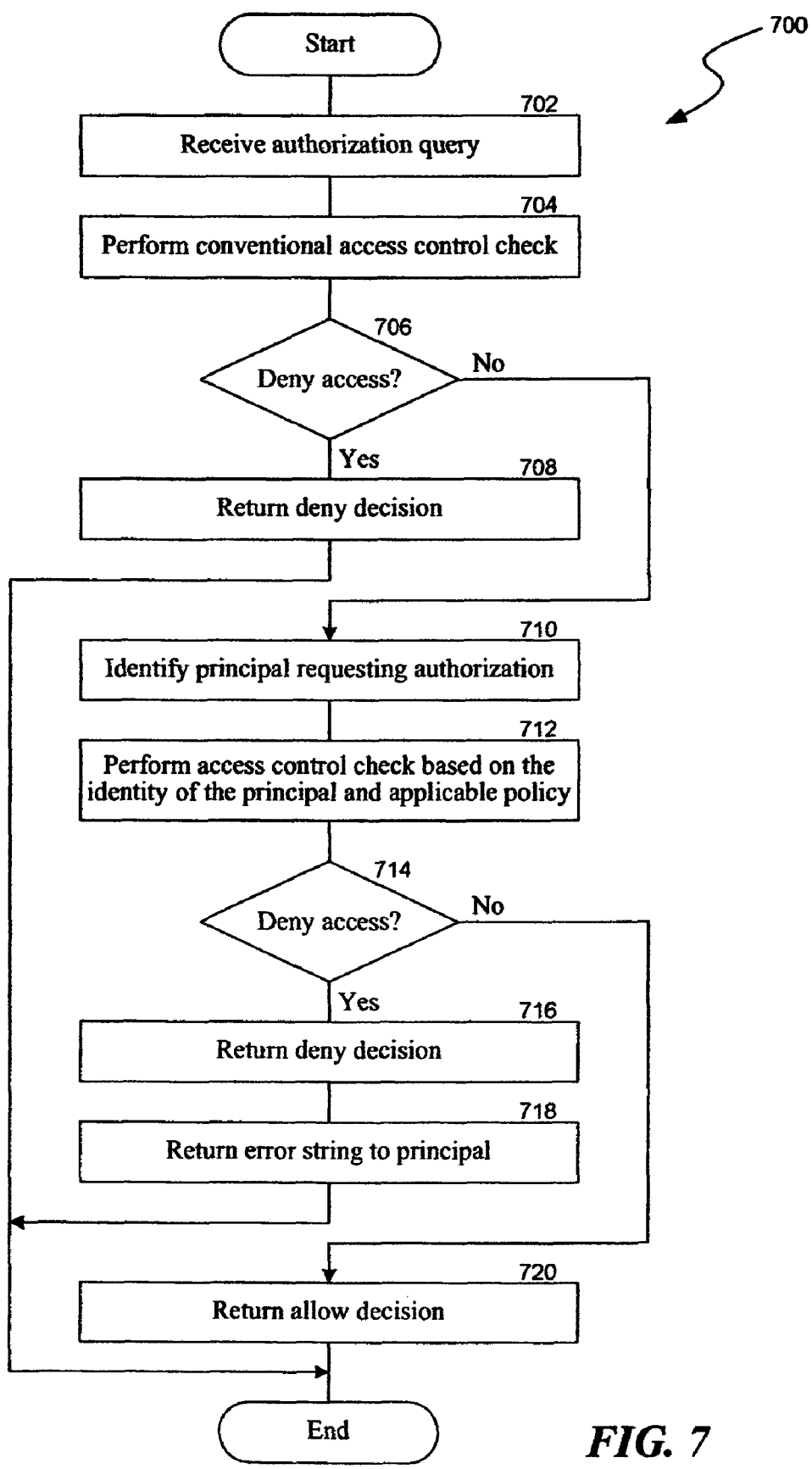
FIG. 7 illustrates a flow chart of a method by which the facility provides a tiered access control check, according to some embodiments.

FIG. 7 illustrates a flow chart of a method 700 by which the facility provides a tiered access control check, according to some embodiments. Referring again to one of the prior examples, a user (e.g., UserABC) may have logged on to a computer and started a word processing application (e.g., WPApp) and requested to open a file (e.g., FileX) stored in a directory (e.g., YZDir) on the computer. As a result, WPApp issues a request to access the resource FileX stored in directory YZDir. Beginning at a start step, authorization module 202 receives the authorization query, e.g., a request for authorization to access FileX stored in YZDir, at step 702.

At step 704, an operating system running on the user's computer performs a conventional access control check. Continuing the above example, the operating system may check to determine whether the user has rights to open (e.g., read access) FileX in YZDir. At step 706, the operating system, using its conventional access check mechanism, determines whether to deny the user access to FileX.

If the operating system's conventional access check mechanism determines that the user should be denied access to FileX, then at step 708, the operating system returns a deny decision, and proceeds to an end step. The deny decision is an indication that the user is not authorized to perform the requested action, e.g., open FileX. Alternatively, if the operating system's conventional access check mechanism determines that the user should not be denied access to FileX, then at step 710, authorization module 202 identifies the principal that is requesting the authorization to access FileX stored in YZDir.

At step 712, authorization module 202 identifies the policy applicable to the identified principal, for example, from a centralized policy store such as policies 206, and performs an access control check based on the identity of the principal and the applicable policy. Continuing the above example, authorization module 202 analyzes the identified applicable policy to determine whether a rule or privilege in the policy authorizes the principal to access FileX stored in YZDir, at step 714.

If authorization module 202 determines that the applicable policy authorizes the principal to perform the requested action, then at step 720, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 716, authorization module 202 returns a deny decision, which is an indication that the principal is not authorized to perform the requested action. At step 718, authorization module 202 may return an error string to the principal, and proceeds to an end step. The error string may inform the principal of the lack of authorization to perform the requested action.

It will be appreciated that the tiered access check may be performed in the reverse order from that illustrated by method 700. For example, authorization module 202 first performs its access control check. If authorization module 202 determines that authorization should be given for a particular resource access, then the operating system performs its security check using its conventional access control mechanism.

Figure 8:
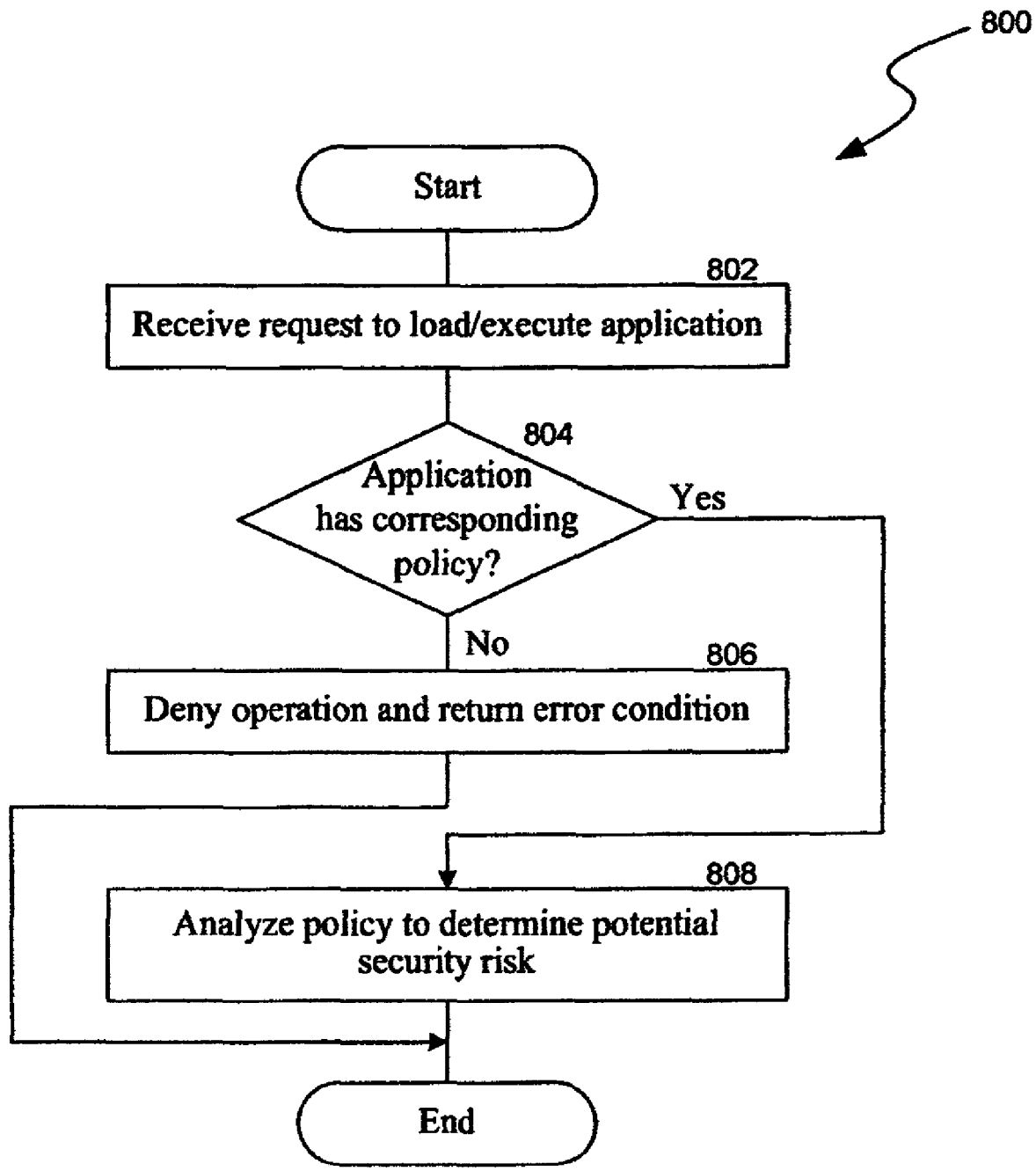
FIG. 8 illustrates a flow chart of a method by which the facility determines a level of security risk of an application program, according to some embodiments.

FIG. 8 illustrates a flow chart of a method 800 by which the facility determines a level of security risk of an application program, according to some embodiments. In particular, the facility makes an assessment of the level of security risk and/or intent of an application program based upon an analysis of a policy designated for the application program. By way of example, a user may have logged on to a computer and requested to load and/or execute an application program on the computer.

Beginning at a start step, an operating system running on the users computer receives a request to load/execute the application program at step 802. At step 804, the operating system invokes the facility to determine whether the application program has a corresponding policy. For example, the policy applicable to the application program may be maintained as part of policies 206. If the facility determines that a policy applicable to the application program does not exist, the facility informs the operating system that an applicable policy does not exist. At step 806, the operating system denies the request to load/execute the application program and returns an error condition. Subsequent to denying the request, the operating system proceeds to an end step for this request.

Alternatively, if, at step 804, the facility determines that a policy applicable to the application program does exist, then at step 808, the facility analyzes the applicable policy to determine the level of potential security risk associated with or resulting from loading/executing the application program. The facility may base the level of risk on the level or extent of authorization granted by the rules in the policy. For example, if the rules authorize the application program to a lot of resources or a number of inherently dangerous resources, the facility may set the level of risk higher than if the rules only authorize the application program to a few, relatively safe resources. The facility informs the operating system that an applicable policy does exist, and proceeds to an end step.

Figure 9:
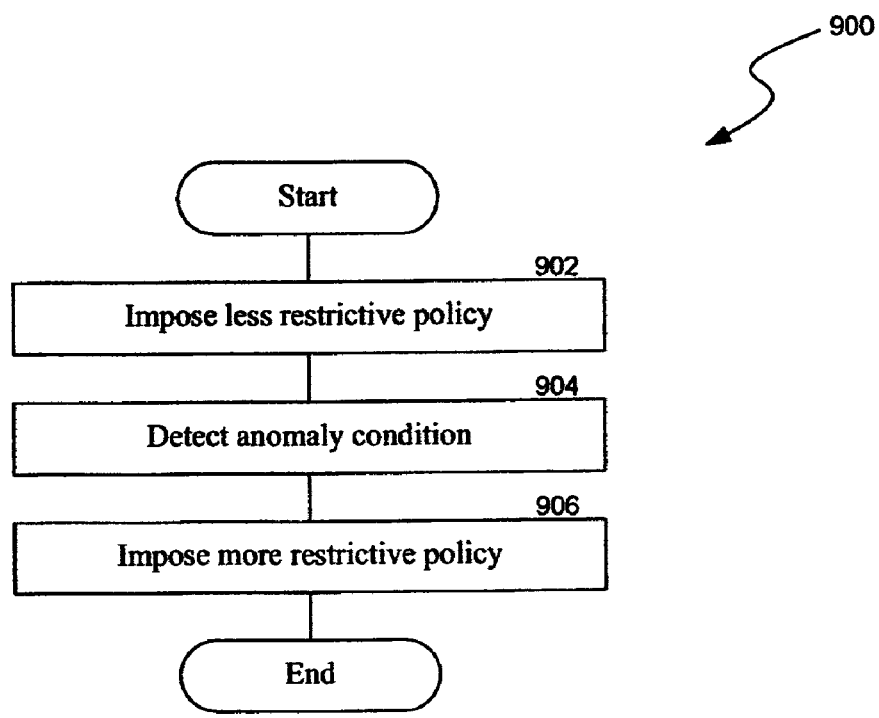
FIG. 9 illustrates a flow chart of a method by which the facility imposes a more restrictive policy upon detecting an anomaly, according to one embodiment.

FIG. 9 illustrates a flow chart of a method 900 by which the facility imposes a more restrictive policy upon detecting an anomaly, according to some embodiments. By way of example, the facility running on a computer may have two policies, a PolicyA and a PolicyB, which are applicable to an application program. Moreover, PolicyA may be less restrictive than PolicyB in that PolicyA grants authorization to a greater number of resources.

Beginning at a start step, the facility imposes the less restrictive PolicyA at step 902. At step 904, the facility may detect an anomalous state in an instance of the application program executing on the computer. Continuing the above example, an instance of the application program may be executing on the computer, and the facility may be monitoring the executing application program process. While monitoring the application program process, the facility may detect an anomalous condition or state in the process. For example, the facility may have previously generated a directed graph that represents the system calls normally issued by the application program by tracking previous instances of the application program that ran on the computer, and determined the presence of an anomalous state from a comparison of the system calls made by the current application program process and the directed graph.

At step 906, the facility imposes the more restrictive PolicyB in response to detecting the anomalous state, and proceeds to an end step. In one embodiment, the facility imposes the more restrictive PolicyB on the application program process in which the anomalous state was detected. Alternatively, the facility may impose the more restrictive PolicyB on the application program, e.g., all instances or processes of the application program. Moreover, depending on the detected anomaly, the application program, and/or the particular policy, the facility may impose a set of more restrictive policies on the entire computer, e.g., more restrictive policies are applied to all processes executing on the computer.

Figure 10:
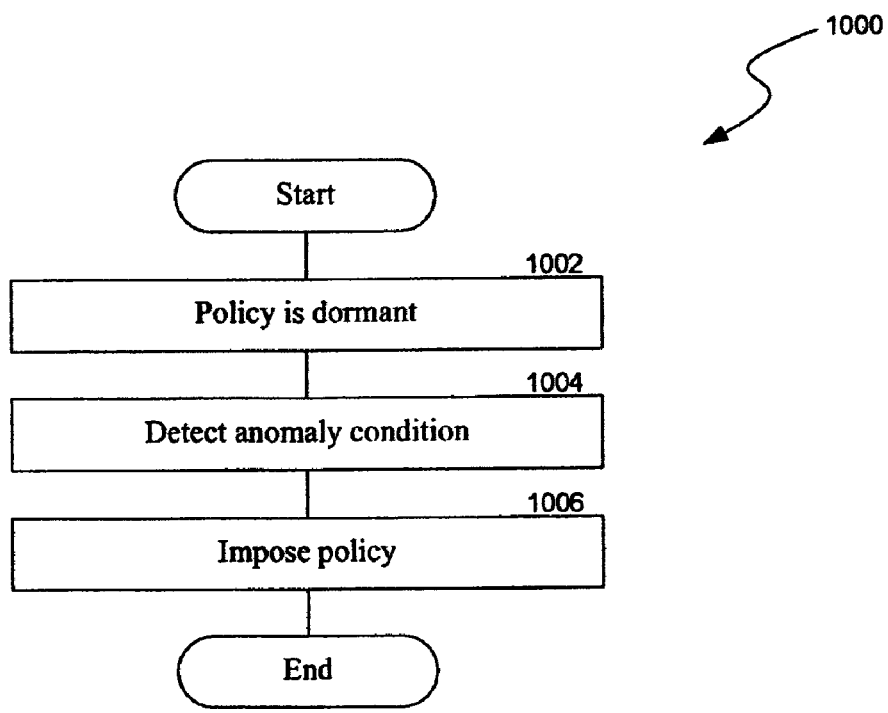
FIG. 10 illustrates a flow chart of a method by which the facility imposes a policy upon detecting an anomaly, according to some embodiments.

FIG. 10 illustrates a flow chart of a method 1000 by which the facility imposes a policy upon detecting an anomaly, according to some embodiments. By way of example, the facility running on a computer may have a policy, PolicyA, which is applicable to a web application program. Beginning at a start step, the facility does not impose the policy on the web application program at step 1002. Thus, PolicyA is dormant and not applied to the instances of the web application program executing on the computer. At step 1004, the facility may detect an anomalous state in an instance of the web application program executing on the computer.

Continuing the above example, an instance of the web application program may be executing on the computer, and the facility may be monitoring the executing web application program process. While monitoring the application program process, the facility may detect an anomalous condition or state in the process. For example, the facility may monitor the network traffic generated or caused by the web application process and determine from the network traffic that an anomalous state is present in the web application process. At step 1006, the facility imposes the dormant policy, PolicyA, on the web application program, for example, on the web application program process in which the anomaly was detected, and proceeds to an end step. Alternatively, the facility may impose PolicyA on all instances or processes of the web application program. Thus, the dormant policy becomes active and applied to the web application program.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A computer-readable storage medium whose contents cause a computer to:
receive an authorization query regarding a request to access a first resource;
identify a principal requesting to access the first resource;
perform an access control check to determine whether to deny authorization to access the first resource, the access control check being based on the principal and a first policy applicable to the principal, wherein the first policy is maintained as part of a centralized policy store and the first policy comprises one or more rules; and
responsive to determining to deny authorization to access the first resource,
return a deny decision denying authorization to access the first resource;
enter an entry into an audit log, the entry recording the denial of authorization; and
responsive to receiving a subsequent authorization query regarding a request from the identified principal to access a second resource,
determine whether the requested access to the second resource comprises an inherently dangerous operation;
responsive to determining that the requested access to the second resource does not comprise an inherently dangerous operation, perform an access control check to determine whether to deny authorization to access the second resource, the access control check being based on the principal and the first policy applicable to the principal; and
responsive to determining that the requested access to the second resource comprises an inherently dangerous operation, impose a second policy applicable to the principal, wherein the first policy and the second policy are different policies, and wherein the second policy is more restrictive than the first policy; and perform an access control check to determine whether to deny authorization to access the second resource, the access control check being based on the principal and the second policy applicable to the principal, wherein the computer instructions are executed as an integral component of an operating system suitable for executing on the computer; and wherein the computer-readable storage medium is not a signal.

2. The computer-readable storage medium of claim 1, wherein the entry identifies the denied request to access the resource.

3. The computer-readable storage medium of claim 1, wherein the entry identifies a rule in the first policy that caused the denial of authorization to access the resource.

4. The computer-readable storage medium of claim 1, wherein the entry identifies the principal.

5. The computer-readable storage medium of claim 1, wherein the entry identifies the requested resource.

6. The computer-readable storage medium of claim 1, wherein the event includes providing an indication of the denied request to an interested party.

7. The computer-readable storage medium of claim 1 further comprising contents that cause the computer to, responsive to determining to allow authorization to access the resource, return an allow decision granting authorization to access the resource, and enter an entry into the audit log, the entry recording the authorization to access the resource.

8. A computer-readable storage medium whose contents cause a computer to:

receive an authorization query regarding a request to perform an operation on a computer;

identify a principal requesting to perform the operation;

perform an access control check to determine whether to allow authorization to perform the operation, the access control check being based on the principal and a policy applicable to the principal, wherein the policy is maintained as part of a centralized policy store and the policy comprises one or more rules;

responsive to determining to allow authorization to perform the operation, determine whether the requested operation is an inherently dangerous operation; and responsive to determining that the requested operation is an inherently dangerous operation, enter an entry into an audit log, the entry recording the authorization to perform an inherently dangerous operation, such that the computer instructions are executed as an integral component of an operating system suitable for executing on the computer; and wherein the computer-readable storage medium is not a signal.

9. The computer-readable storage medium of claim 8 further comprising contents that cause the computer to trigger an event based on the entry in the audit log.

10. A computer-readable storage medium whose contents cause a computer to:

receive an authorization query regarding a request to access a resource on a computer;

perform a first access control check to determine whether to allow or deny authorization to access the resource;

responsive to determining to allow authorization to access the resource based on the first access control check:

identify a principal requesting access to the resource;

perform a second access control check to determine whether to allow or deny authorization to access the resource, the second access control check being based on the principal and a policy applicable to the principal, wherein the policy is maintained as part of a centralized policy store and the policy comprises one or more rules;

responsive to determining to allow authorization to access the resource, return an allow decision granting authorization to access the resource;

determine whether the requested access to the resource comprises an inherently dangerous operation; and responsive to determining that the requested access to the resource comprises an inherently dangerous operation, record an entry into an audit log, the entry comprising the granting of authorization for the inherently dangerous operation; and responsive to determining to deny authorization to access the resource, return a deny decision denying authorization to access the resource, such that the computer instructions for the second access control check are executed as an integral component of an operating system suitable for executing on the computer; and wherein the computer-readable storage medium is not a signal.

11. A method in a computing system for auditing requests to access a resource, the method comprising:

identifying a principal requesting to access a resource;

performing an access control check to determine whether to deny or allows authorization to access the resource, the access control check being based on the principal and a policy applicable to the principal, wherein the policy is maintained as part of a centralized policy store and the policy comprises one or more rules;

responsive to determining to deny authorization to access the resource, returning a deny decision denying authorization to access the resource, and entering an entry into an audit log, the entry recording the denial of authorization; and responsive to determining to allow authorization to access the resource, returning an allow decision granting authorization to access the resource;

determining whether the requested access to the resource comprises an inherently dangerous operation; and responsive to determining that the requested access to the resource comprises an inherently dangerous operation, making an entry into the audit log, the entry recording the granting of authorization for the inherently dangerous operation, wherein the method is performed by an integral component of an operating system executing on the computing system.

12. The method of claim 11 further comprising providing a notification of the denial of authorization to a system administrator.

13. The method of claim 11 further comprising, responsive to determining to deny authorization to access the resource, invoking a second policy applicable to the principal, the second policy being applied to a subsequent request made by the principal.

14. The method of claim 11 further comprising, responsive to determining to deny authorization to access the resource, terminating a process associated with the principal, the process being identified as having made the request to access the resource.

15. The method of claim 11 further comprising providing a notification of the grant of authorization to perform the inherently dangerous operation to an entity other than the principal.

16. The method of claim 11 further comprising applying a second policy to the principal, the second policy being stricter than the policy.

* * * * *